United States Patent
Park et al.

(10) Patent No.: US 12,497,425 B2
(45) Date of Patent: *Dec. 16, 2025

(54) PHYSICALLY PRETREATED BIOMASS COMPOSITION COMPRISING A HIGH CONCENTRATION OF BIOMASS

(71) Applicant: CJ CheilJedang Corporation, Seoul (KR)

(72) Inventors: Jeungyil Park, Seoul (KR); Youngran Kim, Seoul (KR); Dongjun Seo, Seoul (KR); Hansol Lee, Seoul (KR); Minho Jung, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 973 days.

This patent is subject to a terminal disclaimer.

(21) Appl. No.: 16/967,890

(22) PCT Filed: May 31, 2018

(86) PCT No.: PCT/KR2018/006253
§ 371 (c)(1),
(2) Date: Aug. 6, 2020

(87) PCT Pub. No.: WO2019/231024
PCT Pub. Date: Dec. 5, 2019

(65) Prior Publication Data
US 2021/0395286 A1 Dec. 23, 2021

(30) Foreign Application Priority Data
May 28, 2018 (KR) .................. 10-2018-0060552

(51) Int. Cl.
*C07H 1/08* (2006.01)
*C07G 1/00* (2011.01)
*C07H 3/02* (2006.01)

(52) U.S. Cl.
CPC .......... *C07H 1/08* (2013.01); *C07G 1/00* (2013.01); *C07H 3/02* (2013.01)

(58) Field of Classification Search
CPC ... C07H 1/08; C07H 3/02; C07H 1/00; C07G 1/00; C12P 2201/00; C12P 19/02; C08H 8/00
See application file for complete search history.

(56) References Cited

U.S. PATENT DOCUMENTS

| | | | |
|---|---|---|---|
| 2011/0000268 A1 | 1/2011 | Schaafsma et al. | |
| 2016/0312318 A1 | 10/2016 | Ottonello | |
| 2017/0275385 A1* | 9/2017 | Capanema | ............ C08L 97/005 |
| 2018/0066293 A1* | 3/2018 | Charron | .................. C08L 97/02 |
| 2021/0002734 A1* | 1/2021 | Park | ....................... C10G 31/09 |

FOREIGN PATENT DOCUMENTS

| | | | |
|---|---|---|---|
| JP | 2013-530726 A | 8/2013 | |
| JP | 2015-531227 A | 11/2015 | |
| KR | 10-2014-0080620 A | 7/2014 | |
| KR | 20140080620 A * | 7/2014 | ................ C10L 1/02 |
| KR | 10-2015-0041666 A | 4/2015 | |
| KR | 10-2015-0051325 A | 5/2015 | |
| WO | WO-2009045651 A2 * | 4/2009 | ............. C12P 19/02 |
| WO | 2012/012594 A1 | 1/2012 | |
| WO | 2014/039984 A1 | 3/2014 | |

OTHER PUBLICATIONS

Han, G. et al., Effect of steam explosion treatment on characteristics of wheat straw. Industrial Crops and Products. 2010, 31, 28-33 (Year: 2010).*
Kim, H. J. et al., Environmentally friendly pretreatment of plant biomass by planetary and attrition milling. Bioresource Technology. 2013, 144, 50-56 (Year: 2013).*
Roche, C. M., et al. Biotechnology and Bioengineering, vol. 104, No. 2, 2009. (Year: 2009).*
Nguyen, T. D., et al. Bioresource Technology. 101, 2010, 7432-7438. (Year: 2010).*
Hyung L. J., et al. KR-20140080620-A. English Translation. (Year: 2014).*
Movafagh, H., et al. Biofuels, 2016, 7(4), 365-375. (Year: 2016).*
He et al, "Rheological Study of Comingled Biomass and Coal Slurries with Hydrothermal Pretreatment," Energy Fuels, 23(10): 4763-4767 (2009).
Extended European Search Report issued in corresponding European Patent Application No. 18920535.4 dated Apr. 14, 2021.

(Continued)

*Primary Examiner* — Eric Olson
*Assistant Examiner* — Samuel L Galster
(74) *Attorney, Agent, or Firm* — Morgan, Lewis & Bockius LLP

(57) ABSTRACT

The present disclosure relates to a physically pretreated biomass composition, which enables chemical treatment in a biomass composition comprising a high concentration of a biomass substrate, and a preparation method thereof.
Through specific physical pretreatment (attrition milling) of herbaceous biomass, the physically pretreated biomass composition has fluidity/flowability at a substrate concentration of biomass of 20% (w/w) (biomass:solvent=1:4) or above, and thus the pretreatment cost may be reduced, and it is very useful in biomass treatment processes.

11 Claims, 17 Drawing Sheets

(56) References Cited

OTHER PUBLICATIONS

Barakat et al., "Mechanical pretreatments of lignocellulosic biomass: towards facile and environmentally sound technologies for biofuels production", 2014, RSC Advances, vol. 4, p. 48109-48127, DOI: 10.1039/c4ra07568d.
Office Action issued Dec. 19, 2023 for Brazilian Patent Application No. BR112020016160-8 (See Explanation of relevance).
International Search Report issued in corresponding International Patent Application No. PCT/KR2018/006253 dated Feb. 26, 2019.

* cited by examiner

[FIG. 1]

| | | Corn stover | Wheat straw | *Miscanthus sacchariflorus* | Rice straw | Bagasse |
|---|---|---|---|---|---|---|
| Attrition milling | Shape | | | | | |
| | Mixability | O | O | O | O | O |
| Grinder milling | Shape | | | | | |
| | Mixability | X | X | X | X | X |
| Hammer milling | Shape | | | | | |
| | Mixability | X | X | X | X | X |
| Cutter milling | Shape | | | | | |
| | Mixability | X | X | X | X | X |

[FIG. 2]

| Measurement item | Viscosity | Yield stress, Flow stress |
|---|---|---|
| Measurement condition | - Shear rate: 1~100 1/s<br>- Temperature: 25°C | - Shear strain 1~100 Pa<br>- Temperature: 25°C |
| Measurement equipment | Measured by a 4-bladded stirrer type | |

D... diameter
L... length
La... active length

Denotation of wings:
D... diagonal
V... vertical

| Stirrer ST22-4V-40/113 | |
|---|---|
| D | 22 |
| Wings | 4 V |
| L | 40 |
| La | 113 |

[FIG. 3a]
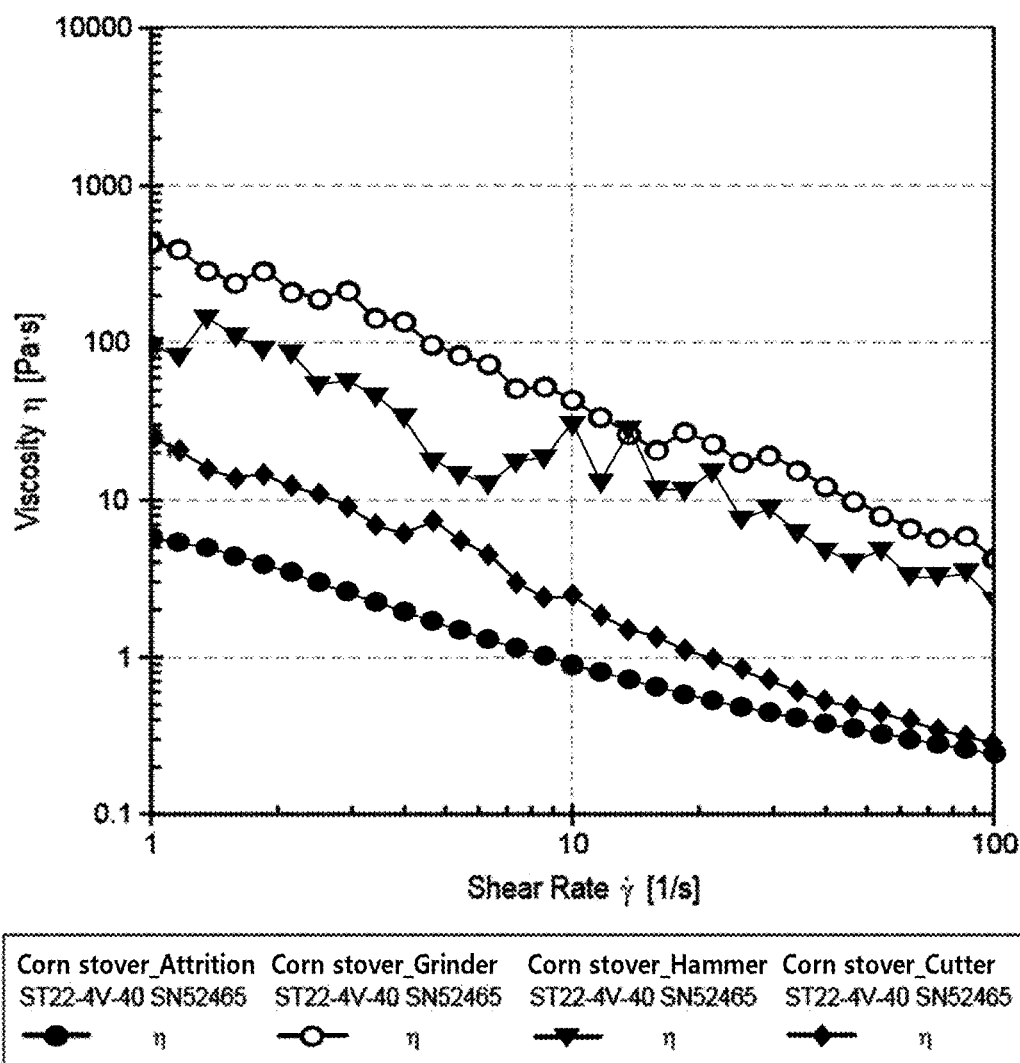

[FIG. 3b]
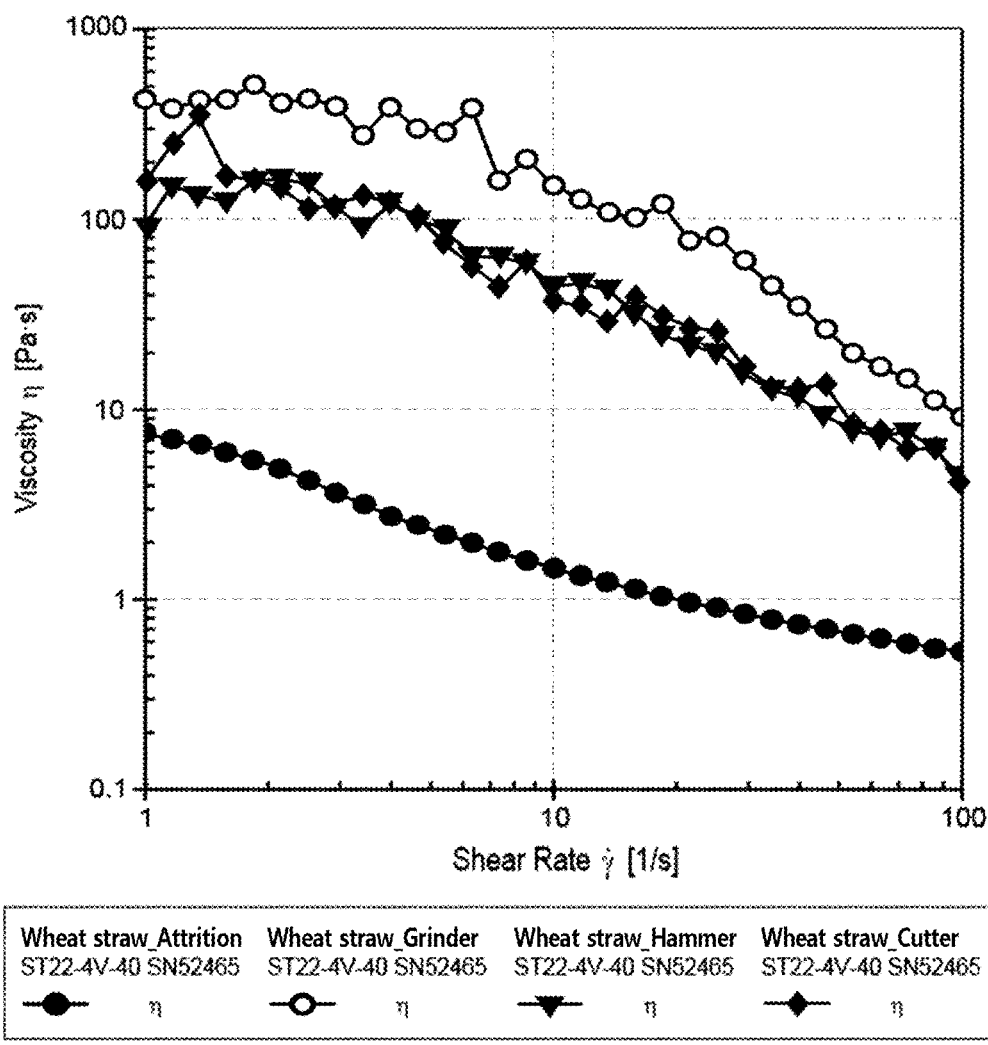

[FIG. 3c]
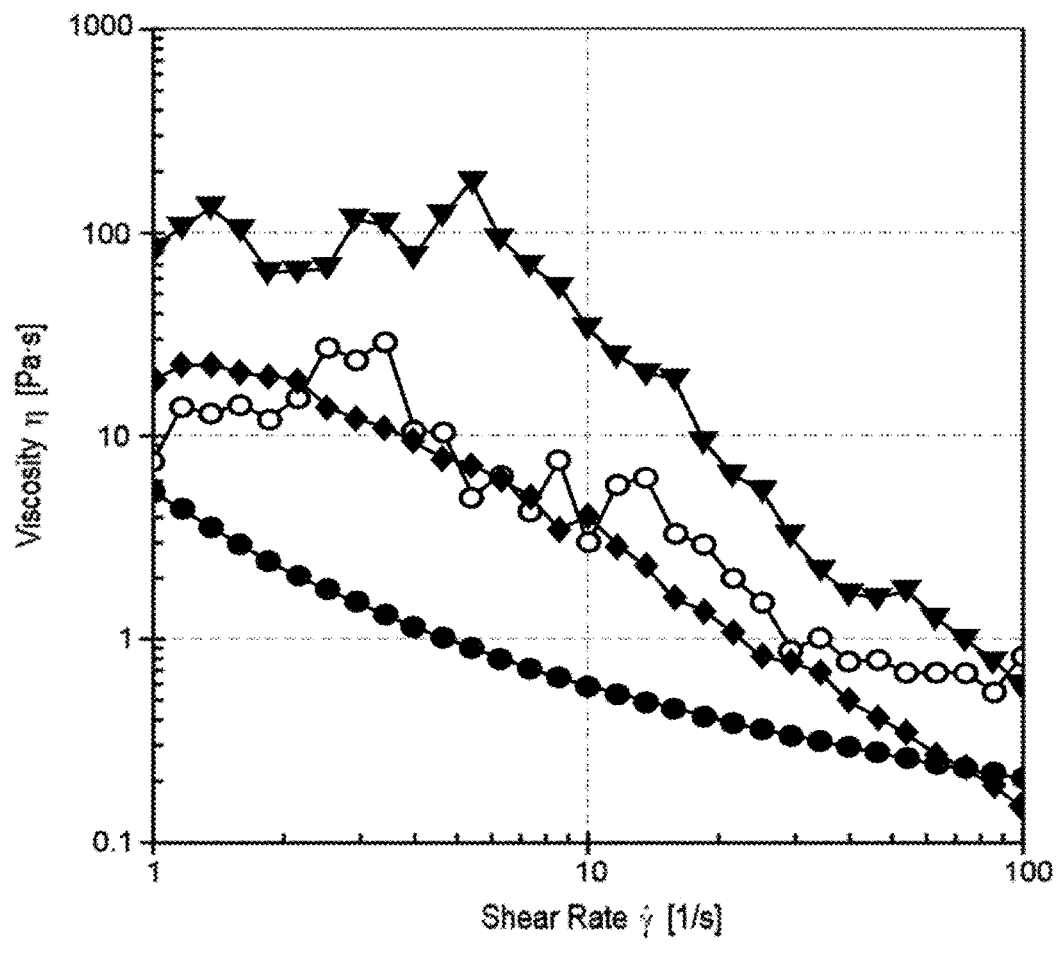

[FIG. 3d]
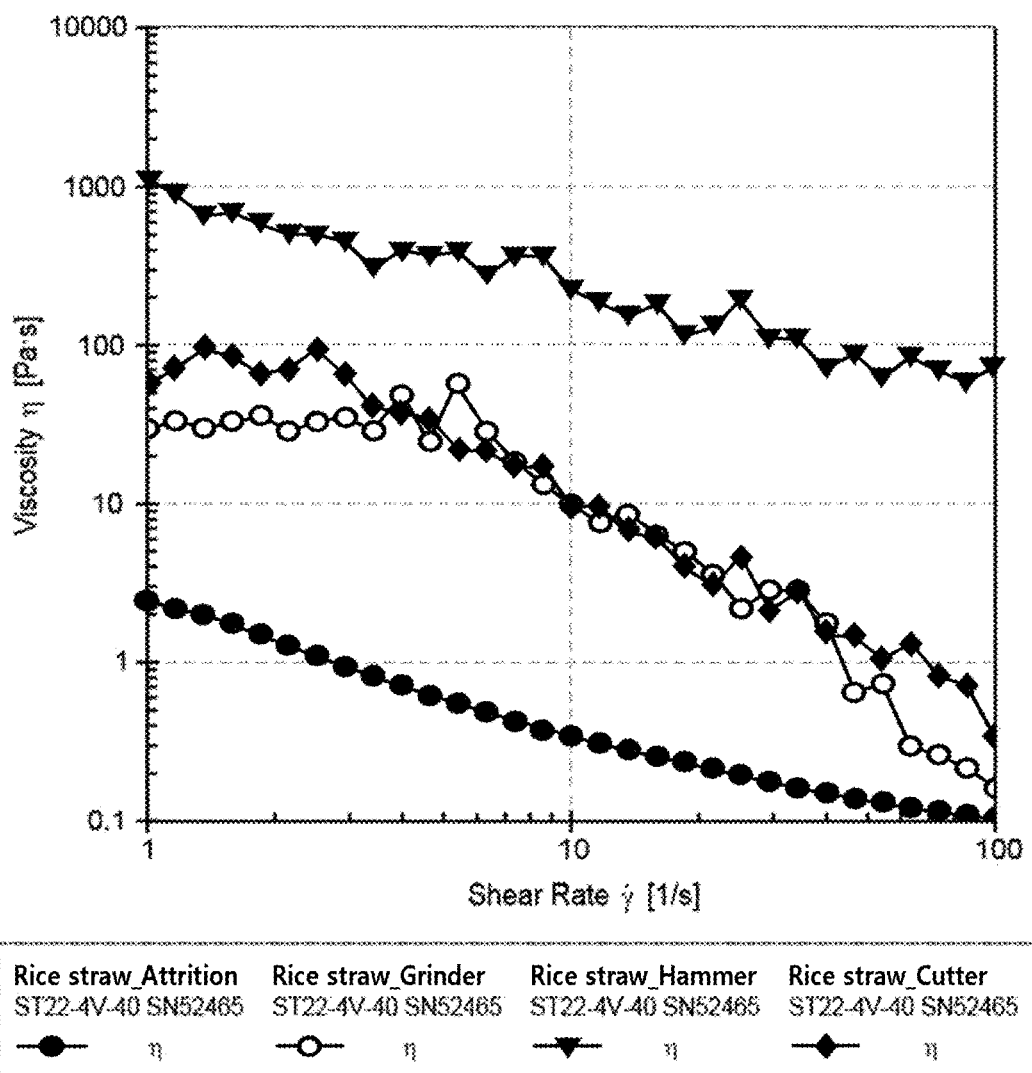

[FIG. 3e]
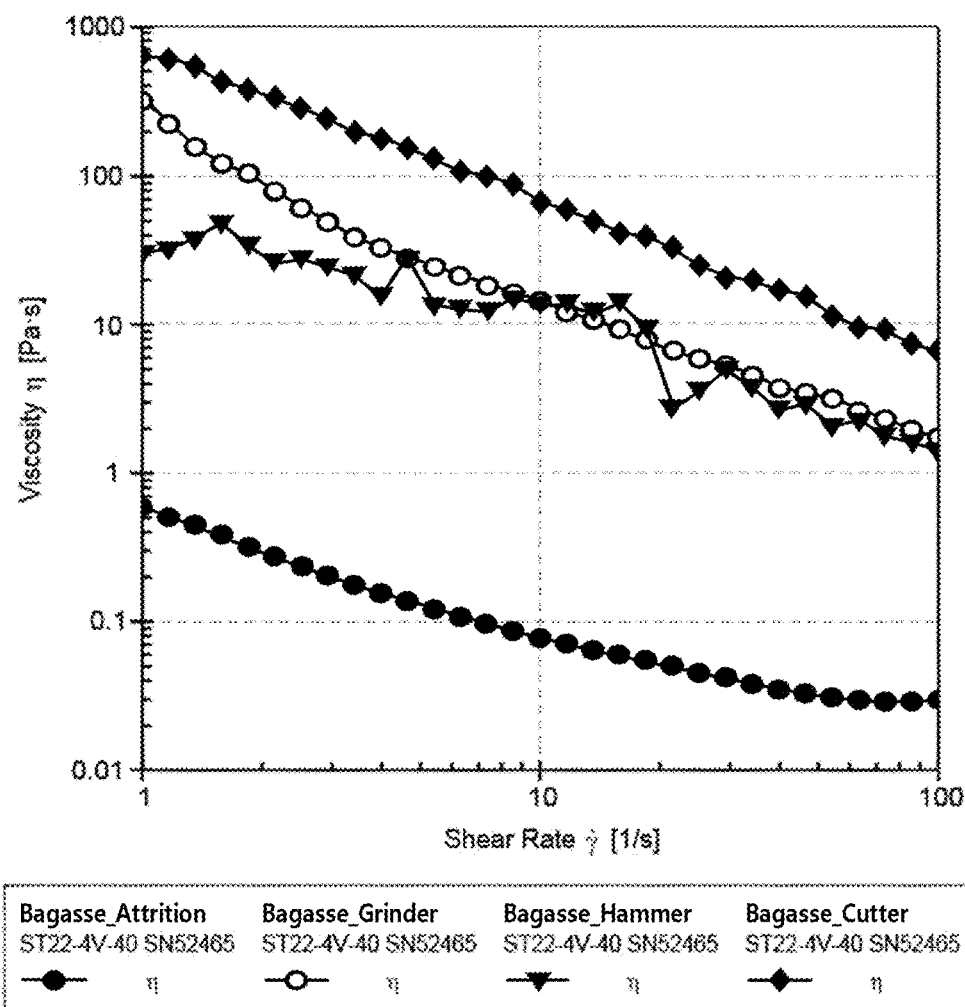

[FIG. 4a]
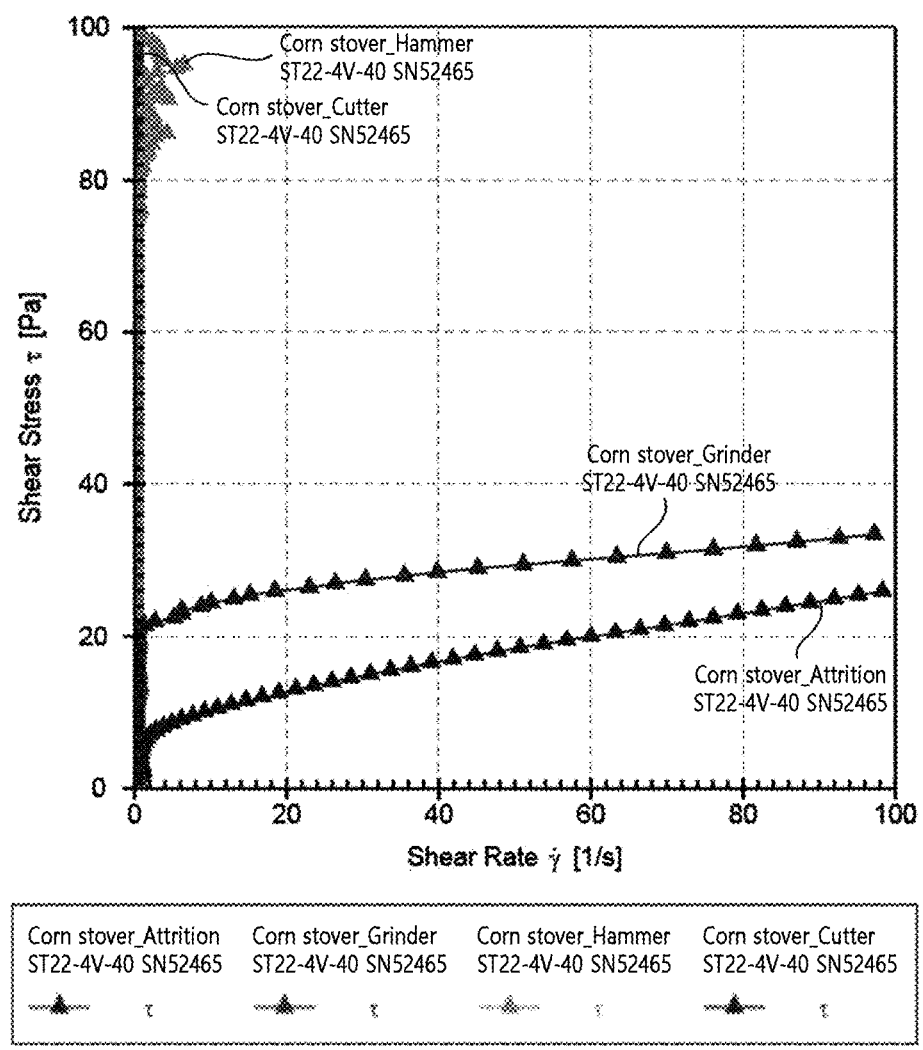

[FIG. 4b]
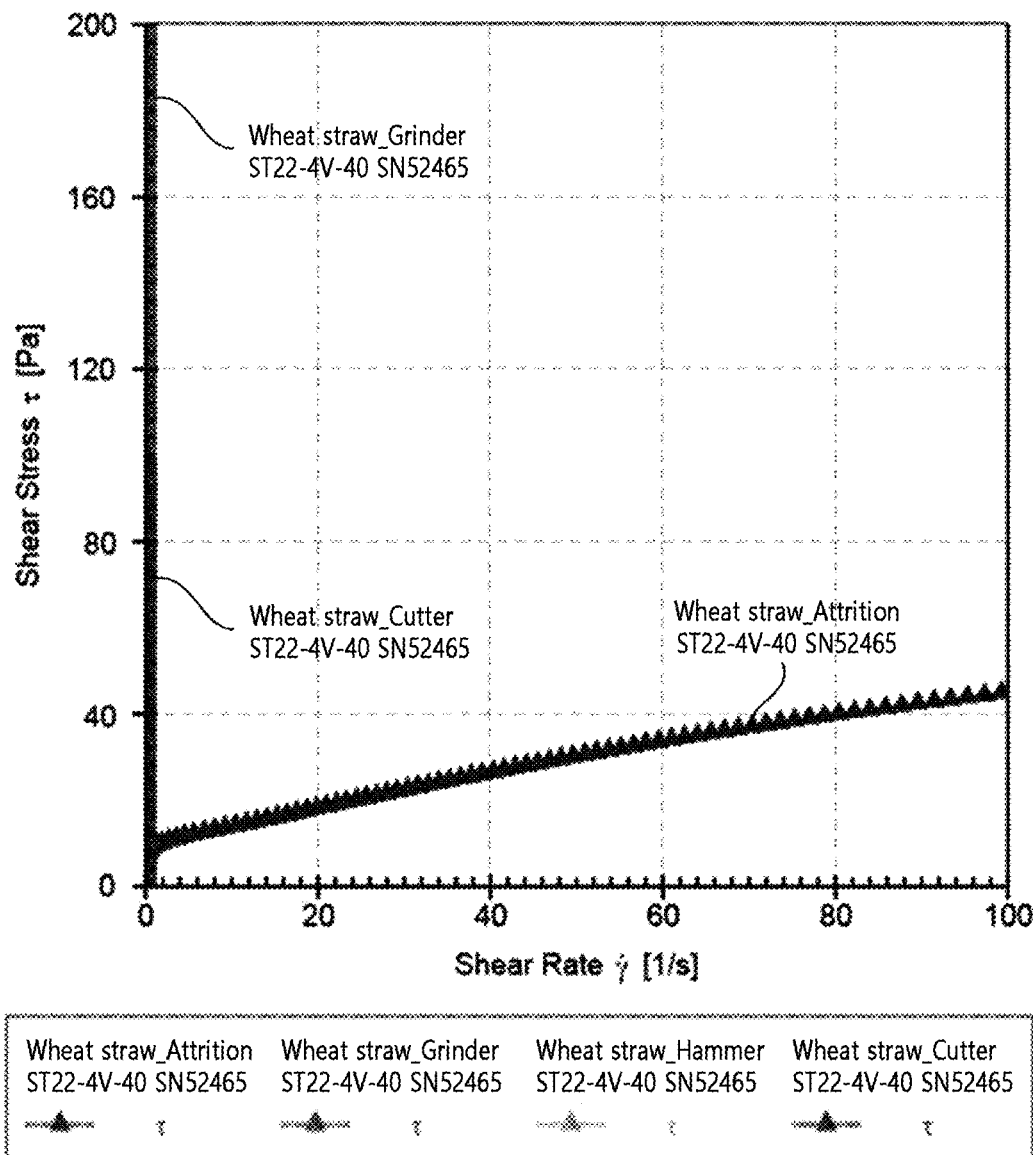

[FIG. 4c]
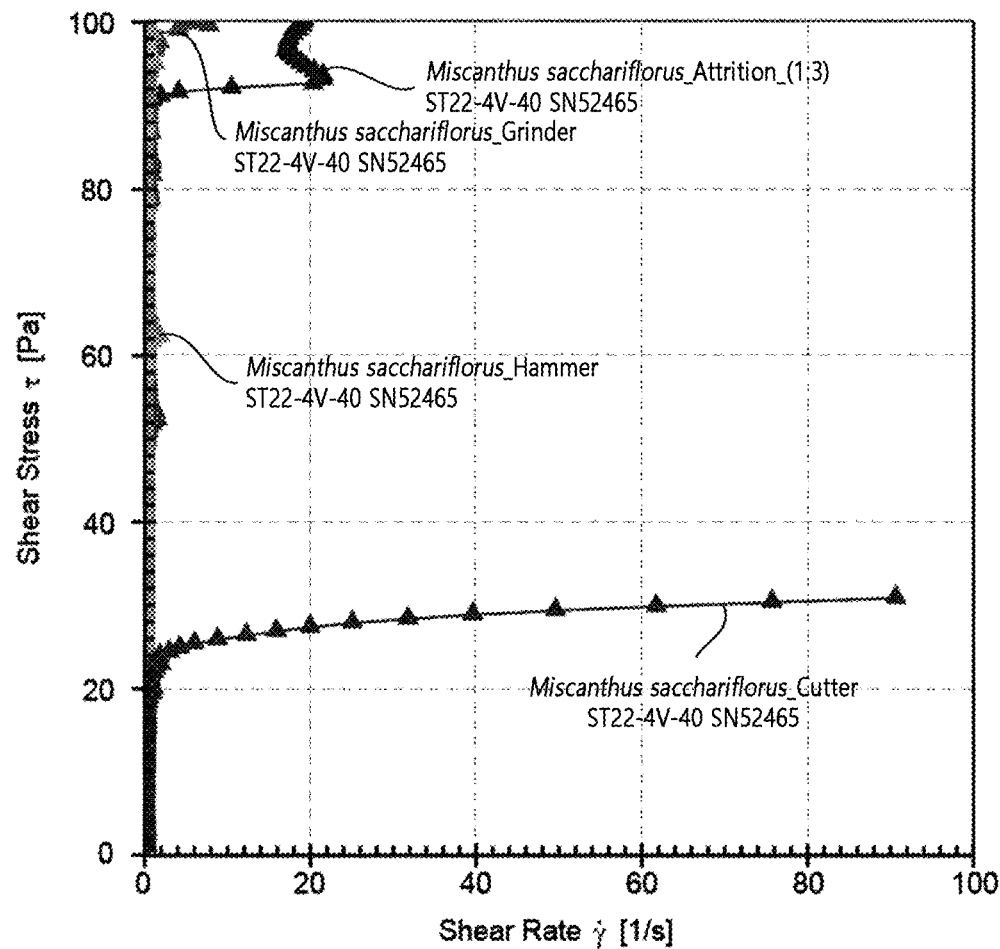

[FIG. 4d]
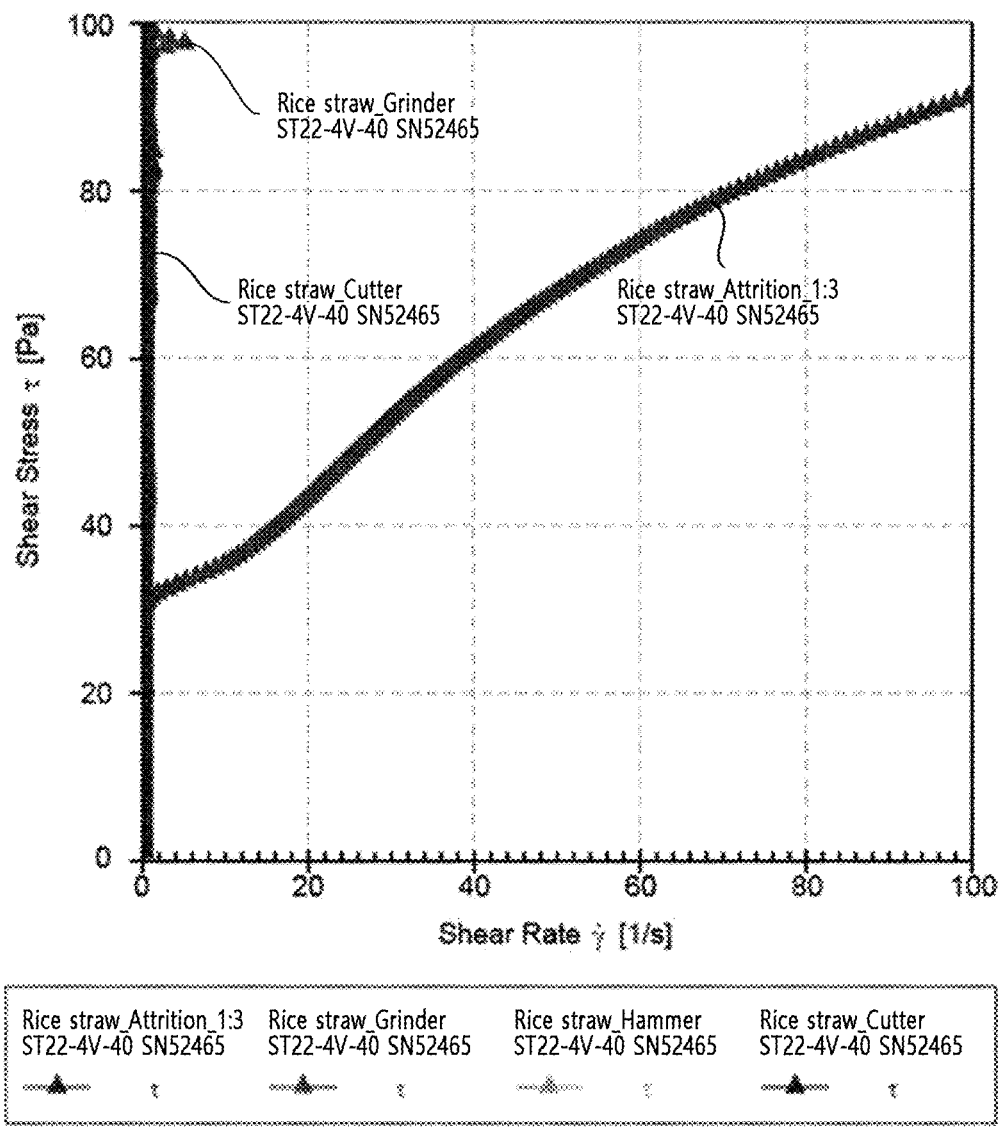

[FIG. 4e]
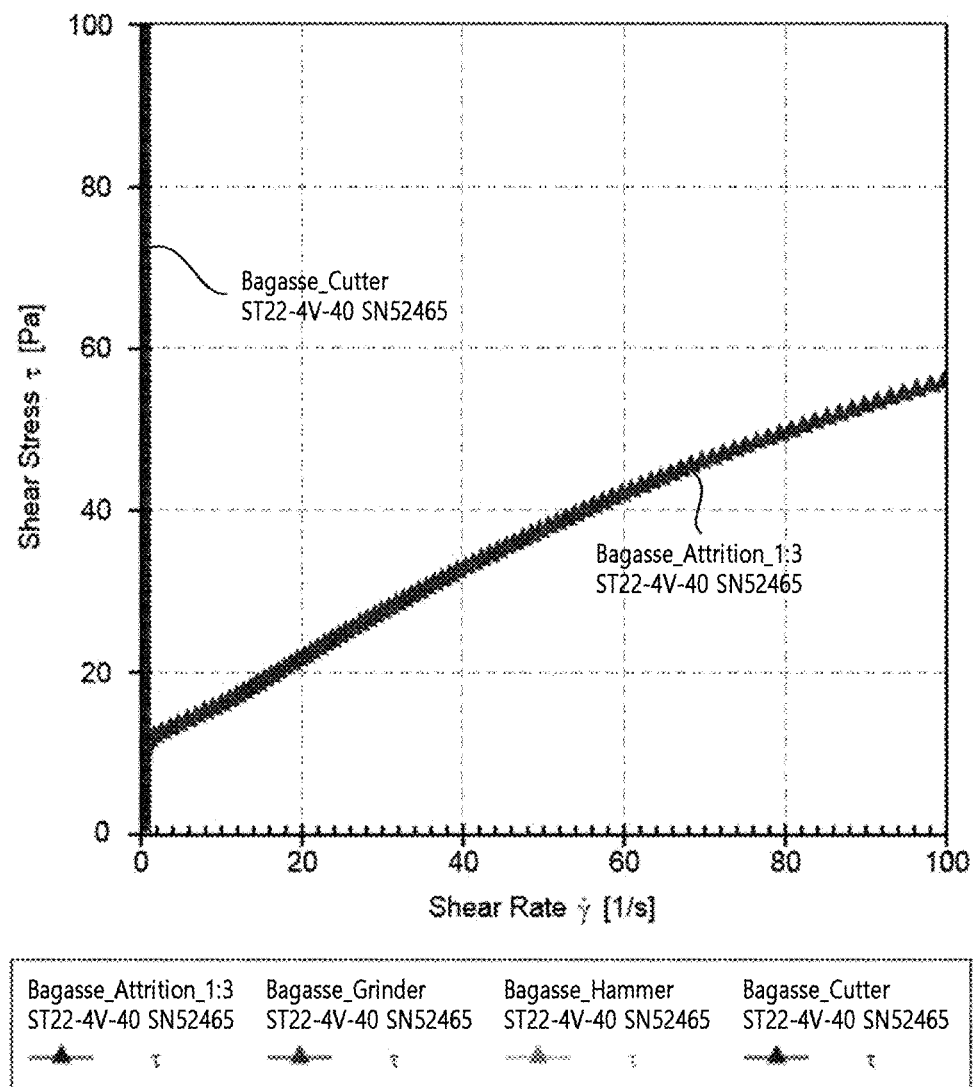

[FIG. 5a]
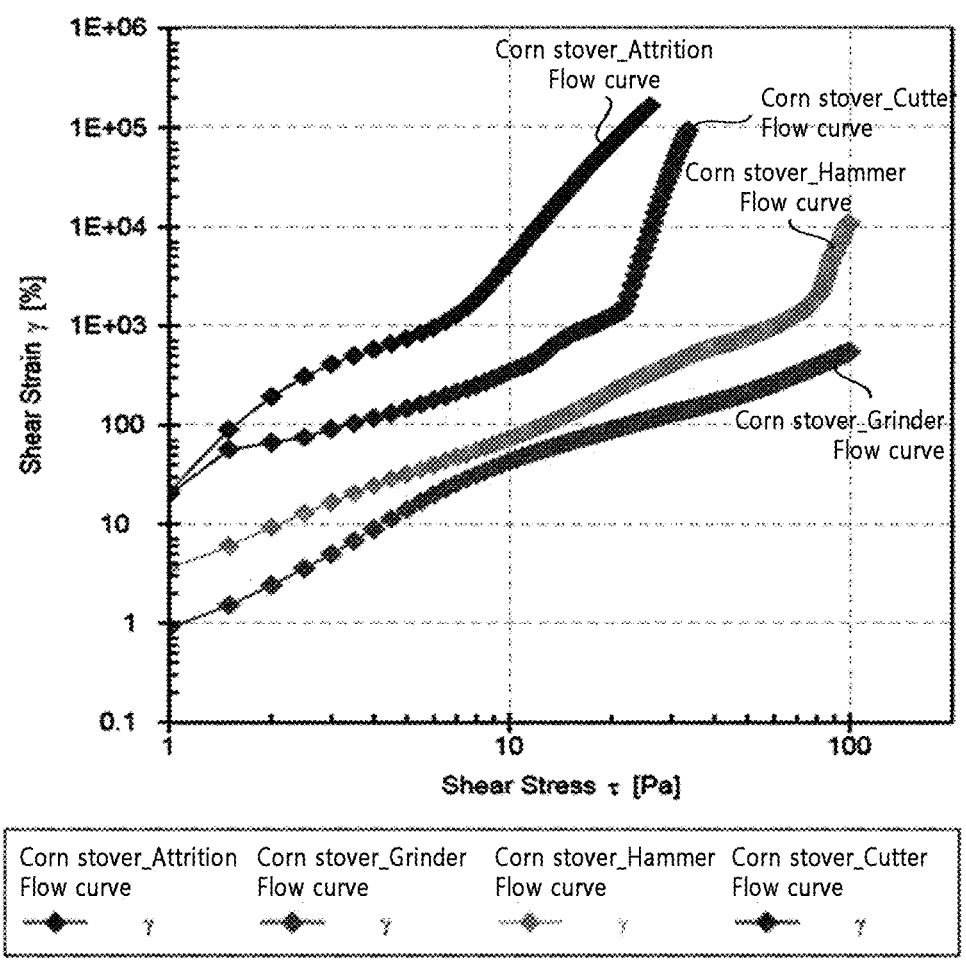

[FIG. 5b]
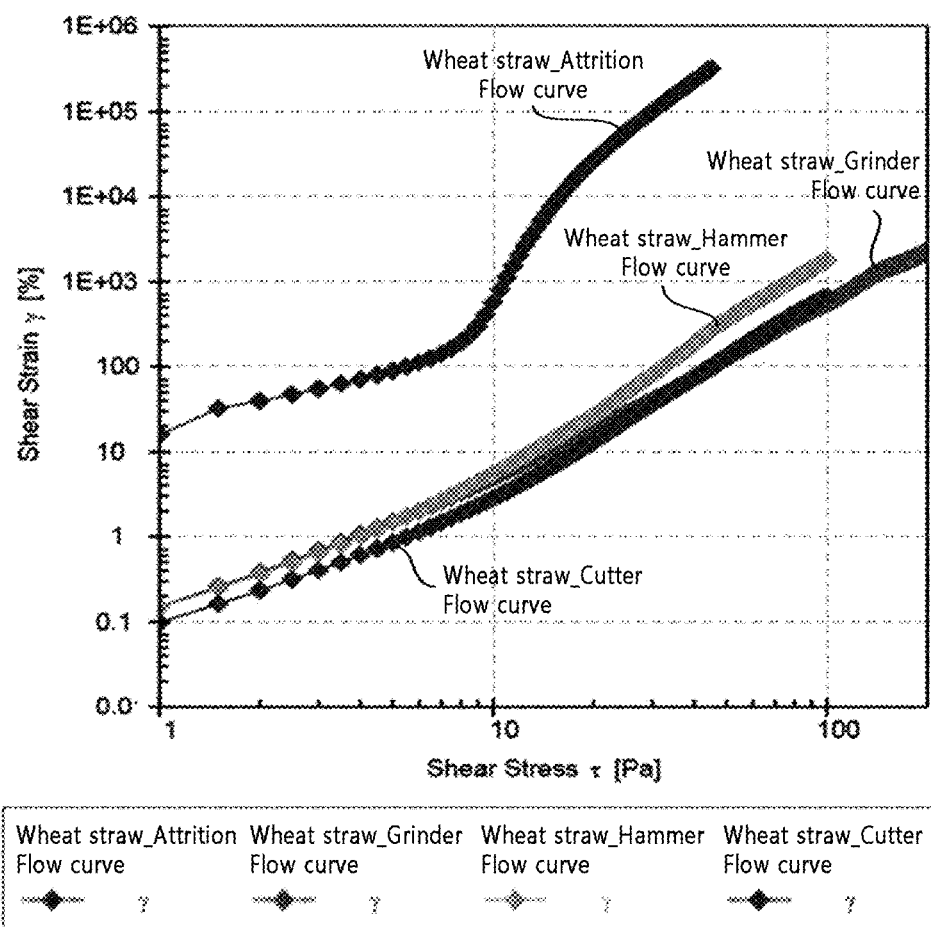

[FIG. 5c]
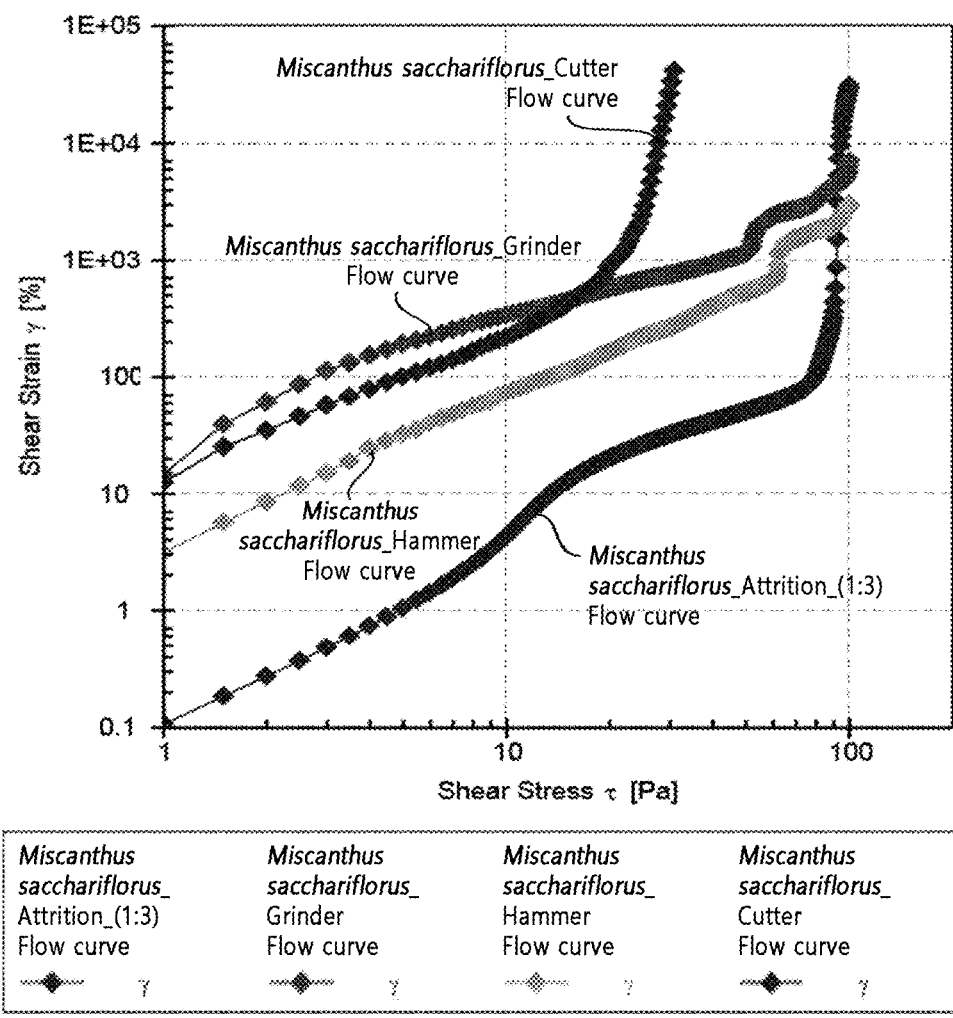

[FIG. 5d]
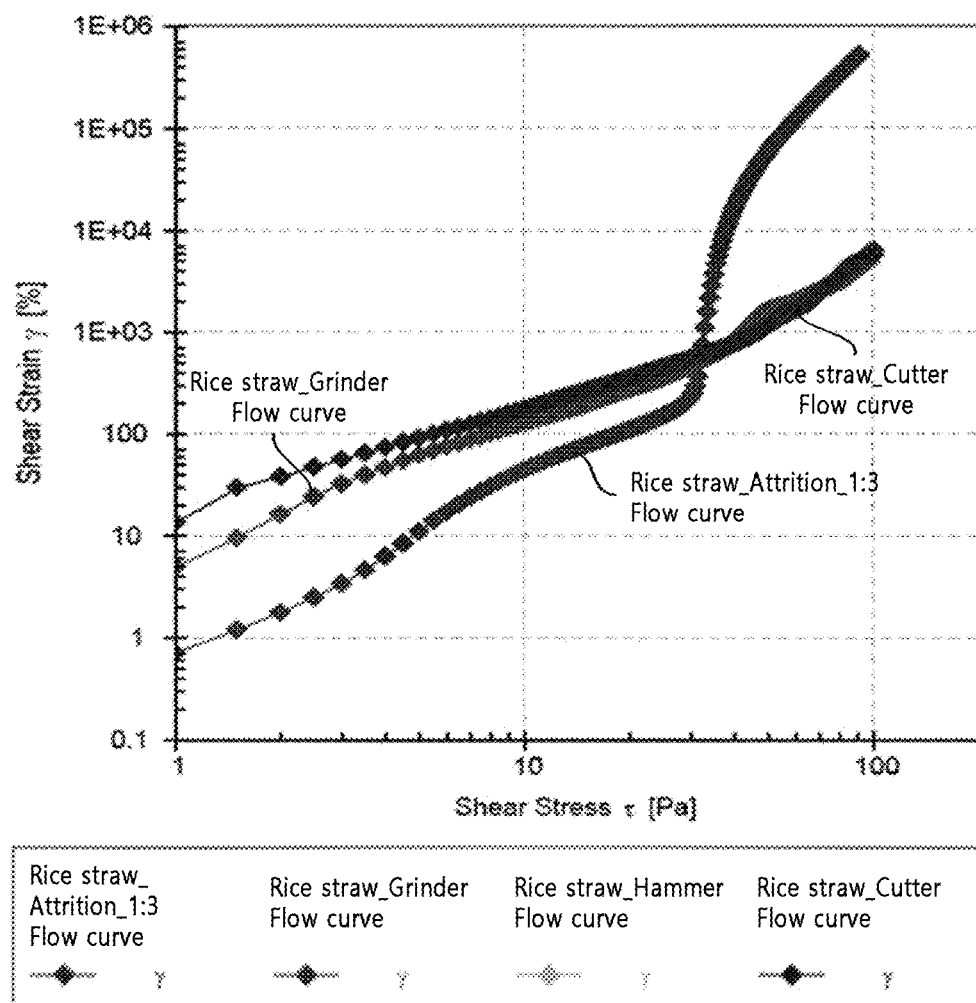

[FIG. 5e]
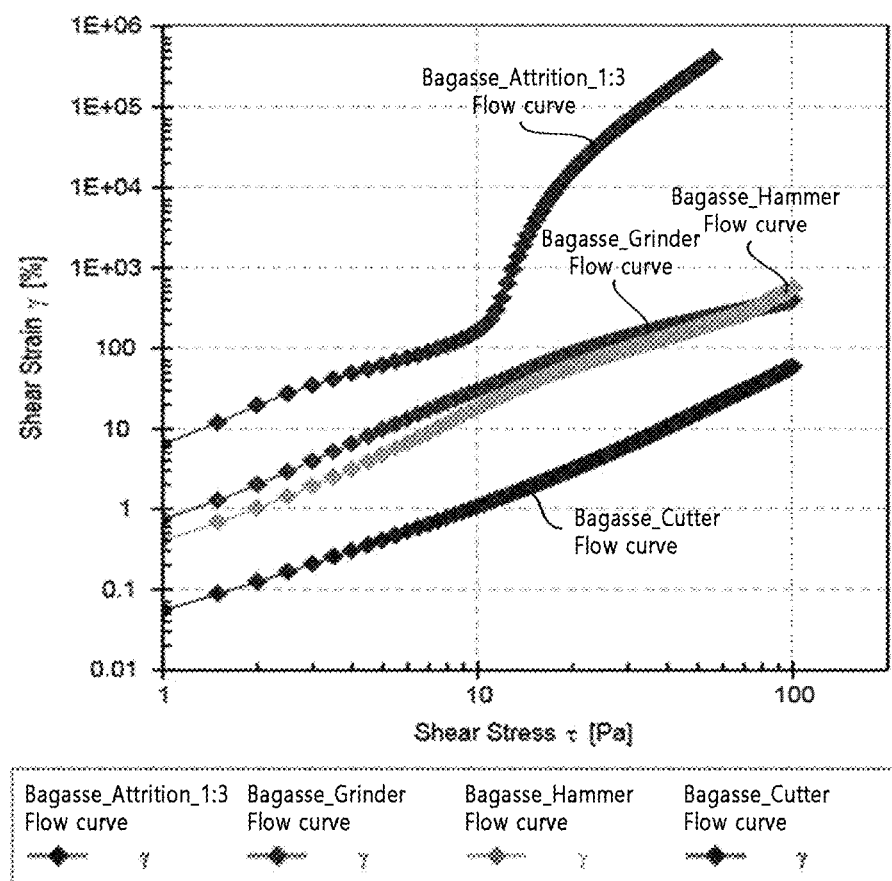

PHYSICALLY PRETREATED BIOMASS COMPOSITION COMPRISING A HIGH CONCENTRATION OF BIOMASS

TECHNICAL FIELD

The present disclosure relates to a physically pretreated biomass composition, which comprises a high concentration of a biomass substrate, for enabling chemical treatment, and a preparation method thereof.

BACKGROUND ART

Lignocellulosic biomass is composed of a non-degradable structure of cellulose, hemicellulose, and lignin. In order to use lignocellulosic biomass as a sustainable supply source of biofuels and biochemicals, it must be economically converted into useful intermediates such as sugar. It can be converted into fermentable sugar after passing through physical pretreatment, chemical pretreatment, and biological pretreatment that are suitable for lignocellulosic biomass properties.

The above pretreatment processes are an essential step in converting lignocellulosic biomass into sugar, but they have the highest operating cost among all processes. One of the most important methods to reduce such pretreatment costs is to increase biomass loading amounts and minimize solvent use, and through this, it can not only reduce the size of upstream processes and investment costs, but also it can reduce the costs for solid-liquid separation of downstream processes and solvent recycling.

However, when conventional techniques are used, high solid concentrations (high concentration substrate conditions) can have negative effects due to inadequate mixing, resulting in low sugar conversion. Specifically, in order to obtain sufficient mixing under high concentration substrate conditions, a special stirring method must be applied, and in this case, high power consumption is required. In addition, biomass slurry under such high concentration substrate conditions must be transported through various unit processes during the process, and at high solid concentrations, these mixing and transport problems become difficult because the slurry is thick and pasty. Therefore, the fluidity and flowability of the biomass slurry under a high concentration substrate condition greatly affect equipment that is used such as reactors and pumps, and it is a main factor for the increase in investment costs.

In addition, in case of herbaceous biomass, because of the remarkably low raw material density characteristics, the moisture content relative to the biomass volume is extremely limited at a solid (biomass) concentration of 10% or more; that is, because the solvent cannot sufficiently moisten the biomass, the chemical pretreatment reaction cannot proceed.

DISCLOSURE

Technical Problem

In order to solve the problems above, biomass treatment methods using various physical pretreatment methods are being studied, and Korean Patent No. 10-1171922 discloses a process of reducing the size of initial biomass by stone grinding, mechanical ripping, tearing, and pin grinding for the pretreatment of biomass and then decomposing biomass through electron beam irradiation. However, in this case, two pretreatment processes are performed, and above all, electron beam irradiation has high energy consumption, and thus there is a problem in that it consumes more energy than the energy generated through actual biomass decomposition, and therefore a solution therefor is required.

Technical Solution

An object of the present disclosure is to provide a physically pretreated biomass composition, wherein a concentration of the biomass substrate is in a range of 20% (w/w) to 30% (w/w) and a viscosity of the composition is in a range of 0.01 [Pa·s] to 10 [Pa·s].

Another object of the present disclosure is to provide a method for preparing a biomass composition, comprising (a) physically pretreating biomass; and (b) mixing the physically pretreated biomass and a solvent at a ratio (w/w) of 20:80 to 30:70 and stirring, wherein a concentration of the biomass is in a range of 20% to 30% (w/w) and a viscosity of the composition is in a range of 0.01 [Pa·s] to 10 [Pa·s].

Advantageous Effect

Through specific physical pretreatment (attrition milling) of herbaceous biomass, the physically pretreated biomass composition of the present disclosure has fluidity/flowability at a substrate concentration of biomass of 20% (w/w) (biomass:solvent=1:4) or above, and thus the pretreatment cost may be reduced, and it is very useful in biomass treatment processes.

BRIEF DESCRIPTION OF DRAWINGS

FIG. 1 is a diagram showing the mixing property of a physically pretreated biomass composition having a concentration of the biomass substrate of 20% (w/w).

FIG. 2 is a diagram showing the rheometer measurement conditions for measuring the rheological properties of a physically pretreated biomass slurry.

FIG. 3 is a graph showing viscosity versus shear rate of a physically pretreated biomass slurry (a: corn stover, b: wheat straw, c: *Miscanthus sacchariflorus*, d: rice straw, and e: bagasse).

FIG. 4 is a graph showing the yield stress of a physically pretreated biomass slurry (a: corn stover, b: wheat straw, c: *Miscanthus sacchariflorus*, d: rice straw, and e: bagasse).

FIG. 5 is a graph showing the flow stress of a physically pretreated biomass slurry (a: corn stover, b: wheat straw, c: *Miscanthus sacchariflorus*, d: rice straw, and e: bagasse).

BEST MODE FOR CARRYING OUT THE INVENTION

Hereinafter, the present disclosure will be described in detail.

Meanwhile, each description and embodiment disclosed in the present disclosure may be applied to each other description and embodiment. That is, all combinations of the various elements disclosed in this application fall within the scope of the present disclosure. In addition, it cannot be said that the scope of the present disclosure is limited by the specific descriptions described below. In addition, those skilled in the art can recognize or identify a number of equivalents for a particular aspect described in the present disclosure using only conventional experimentation. In addition, such equivalents are intended to be included in the present disclosure.

An aspect of the present disclosure to achieve the above objects provides a physically pretreated biomass composition, wherein a concentration of the biomass is in a range of 20% to 30% (w/w) and a viscosity of the composition is in a range of 0.01 [Pa·s] to 10 [Pa·s].

As used herein, the term "biomass" collectively refers to plants, which synthesize organic matter by receiving solar energy, and biological organisms such as animals, microorganisms, etc. using plants as food, and in ecological perspective, biomass refers to all species belonging to biological organisms or one species of animals and plants expressed in biomass within a unit area or unit volume of habitat. In addition, biomass is generally irrelevant to life and death and is used in a broad sense, and biomass includes cedar wood, charcoal, biogas, etc., and in industry, organic waste is also included in biomass.

The biomass is largely classified as cultivation resource-based or waste resource-based biomass depending on the raw material, and the cultivation resource-based biomass can be classified into sugar-based, starch-based, cellulose-based, carbohydrate-based, oil-based, freshwater-based, marine-based, microbe-based, etc. depending on the origin. The biomass of the physically pretreated biomass composition of the present disclosure may be cellulose-based biomass including tree-based, herbaceous-based, and pasturage-based biomass, and may be specifically herbaceous biomass, bus it not limited thereto.

In addition, as used herein, the term "herbaceous biomass" collectively refers to rice, leguminous crops, and remnants thereof used for the production of food or feed other than trees growing on grassland, and for example, the herbaceous biomass may be derived from corn stover, wheat straw, *Miscanthus sacchariflorus*, rice straw, or bagasse, but is not limited thereto.

As used herein, the term "pretreatment" collectively refers to a process that allows improving the rate and yield of biomass enzyme hydrolysis. The ultimate purpose of pretreatment is to increase the accessibility of enzymes by reducing the crystallinity of non-degradable structures of cellulose, etc., and to increase the amount of effective enzymes by increasing the specific surface area of biomass. Since the production cost of biofuel is determined according to the degree of efficiency of the pretreatment process, the pretreatment process is regarded as an essential step for converting biomass to biofuel.

The pretreatment method can be largely divided into physical, chemical, and biological methods according to the treatment method. Representative physical methods include milling or steam explosion; chemical methods include dilute acid pretreatment, and soaking in aqueous ammonia (SAA) and ammonia recycled percolation (ARP) which use ammonia as a catalyst; and biological methods include methods using microorganisms such as molds, etc.

The physical pretreatment method of the present disclosure may be the milling treatment of biomass, and the milling may include one or more milling treatments of attrition milling, grinder milling, hammer milling, or cutter milling. Specifically, the physical pretreatment may include the attrition milling treatment using attrition mill, but is not limited thereto.

For the purpose of the present disclosure, the biomass composition may refer to the one that is physically pretreated, and through the physical pretreatment, a composition suitable for chemical and biological pretreatments may be provided.

The physically pretreated biomass composition of the present disclosure may include a high concentration of biomass. The biomass may mean a biomass substrate, a solid content thereof, etc., but is not limited thereto. Including a high concentration of biomass may mean increasing biomass loading in the biomass composition and minimizing solvent use, and it may be to increase the solid-liquid ratio (solid/(solid+liquid)) or biomass substrate ratio (biomass/(biomass+liquid)) in the biomass composition expressed as the concentration of the biomass substrate, but is not limited thereto. In addition, the biomass composition may be a biomass slurry.

In case of herbaceous biomass, due to the significantly low density properties of a raw material, when the biomass concentration is 10% or more, the amount of moisture relative to the volume of biomass is extremely limited; that is, the solvent cannot sufficiently moisten the biomass, and thus the chemical pretreatment reaction cannot proceed. In addition, when the concentration of the biomass substrate of the biomass composition is less than 20%, the size of the reactor which is used during the biomass treatment process is increased, or the final sugar concentration is low, and thus a concentration process is required, resulting in additional costs. When the concentration of the biomass substrate is greater than 30%, there is a problem that it is difficult to implement during a process in a simple stirring method (using an impeller).

The concentration of biomass in the physically pretreated biomass composition of the present disclosure may specifically be 10% to 40% (w/w), 10% to 35% (w/w), 10% to 30% (w/w), 15% to 40% (w/w), 15% to 35% (w/w), 15% to 30% (w/w), 20% to 40% (w/w), 20% to 35% (w/w), or 20% to 30% (w/w), but is not limited thereto.

As used herein, the term "viscosity" refers to resistance to the flow of fluid and is also referred to as internal friction because it is the frictional force that appears inside a moving liquid or gas. That is, it is the sticky property of the liquid. Viscosity is usually regarded as stickiness or internal resistance to the flow of a fluid or gas and can be said to be a measure of resistance to the flow of a fluid, and generally, the lower the viscosity of a fluid, the higher the flowability or fluidity. The unit of viscosity is Pas ($N·s/m^2=kgf·s/m^2$) in the international unit system, and P (poise; $dyn·s/cm^2=g/cm·s$) in the CGS unit system. In addition, viscosity may be used in combination with viscousness, viscosity coefficient, or viscosity factor. In the present disclosure, the viscosity was measured under the rheometer condition of a shear rate of 1 to 100 [1/s] and a 4-bladed stirrer (FIG. 2).

For example, in the present disclosure, it was confirmed that the biomass composition that was physically pretreated through attrition milling treatment had a low viscosity and excellent flowability, and mixing and flowing were easy during stirring.

The viscosity of the physically pretreated biomass composition of the present disclosure may specifically be 0.05 [Pa·s] to 20 [Pa·s], 0.05 [Pa·s] to 15 [Pa·s], 0.05 [Pa·s] to 10 [Pa·s], 0.01 [Pa·s] to 20 [Pa·s], 0.01 [Pa·s] to 15 [Pa·s], or 0.01 [Pa·s] to 10 [Pa·s], but is not limited thereto.

The yield stress and flow stress of the physically pretreated biomass composition having a concentration of the biomass substrate of 20% to 30% (w/w) may be 1 to 100 [pa].

As used herein, the term "stress" is a force per unit area acting inside an object, which usually occurs when an external force is applied and the object deforms to return the shape to its original shape. Therefore, when an object is deformed by applying stress, it is deformed (elastic deformation) in proportion to the stress when the stress is small, and when the stress is removed, it returns to its original state. However, when the stress exceeds a certain limit, there is a case where the deformation rapidly increases, and this limit stress is called the "yield stress" of the material. Above the yield stress, the object does not return to its original shape. In addition, "flow stress" is also referred to as flow stress or deformation stress, and means external stress required to plastically deform a material. In the present disclosure, if the yield stress and the flow stress of the physically pretreated biomass composition are low, it may have fluidity even when a small force is applied, which means that the flowability and fluidity of the biomass composition are excellent.

Specifically, the physically pretreated biomass composition having a concentration of the biomass substrate of 20% to 30% (w/w) may have a yield stress or flow stress in a range of 1 [pa] to 100 [pa], 1 [pa] to 80 [pa], 1 [pa] to 60 [pa], 1 [pa] to 40 [pa], 1 [pa] to 20 [pa], 3 [pa] to 100 [pa], 3 [pa] to 80 [pa], 3 [pa] to 60 [pa], 3 [pa] to 40 [pa], or 3 [pa] to 20 [pa], but is not limited thereto.

In addition, the average particle size of the biomass of the present disclosure may be 10 μm to 50 μm, or it may be a physically treated biomass composition of which the density is 0.4 g/mL to 0.6 g/mL.

As used herein, the term "particle size" refers to the size of powder and granule, and unlike the particle diameter which usually represents the size of a particle as a diameter, the particle size also includes indirect indications such as specific surface area, etc. In case of a perfect spherical shape, a simple relationship is established between the particle diameter and other particle sizes, but it is generally difficult to determine the particle size in one word, and it is expressed as any average representative length, such as an average diameter (average value of lengths in two or more directions) or an equivalent diameter (assuming that a polyhedron is of some simple shape and has a representative length).

In addition, as used herein, the term "density" is a value obtained by dividing the mass of a substance by a volume, and every substance has a unique value. The unit of density is mainly g/mL, g/cm$^3$, etc.

For example, in the present disclosure, since the average particle size of a biomass composition that was physically pretreated through attrition milling treatment was low and the density was high such that the volume occupied by the biomass composition of the same weight was small, it was confirmed that a relatively small amount of a solvent could be used.

The average particle size of the physically pretreated biomass composition of the present disclosure may specifically be 5 μm to 80 μm, 5 μm to 70 μm, 5 μm to 60 μm, 5 μm to 50 μm, 10 μm to 80 μm, 10 μm to 70 μm, 10 μm to 60 μm, 10 μm to 50 μm, or 15 μm to 50 μm, but is not limited thereto.

In addition, the density may specifically be 0.4 g/mL to 0.7 g/mL, 0.4 g/mL to 0.65 g/mL, 0.4 g/mL to 0.6 g/mL, 0.45 g/mL to 0.7 g/mL, 0.45 g/mL to 0.65 g/mL, 0.45 g/mL to 0.6 g/mL, 0.5 g/mL to 0.7 g/mL, 0.5 g/mL to 0.65 g/mL, or 0.5 g/mL to 0.6 g/mL, but is not limited thereto.

In addition, the physically pretreated biomass composition of the present disclosure may include glucose, xylose, lignin, and ash, and may additionally include mannose, galactose, arabinose, etc.

Specifically, based on 100 parts by weight of the biomass composition, glucose may be included in a range of 25 parts by weight to 55 parts by weight, 25 parts by weight to 50 parts by weight, 25 parts by weight to 45 parts by weight, 30 parts by weight to 55 parts by weight, 30 parts by weight to 50 parts by weight, 30 parts by weight to 45 parts by weight, 35 parts by weight to 55 parts by weight, 35 parts by weight to 50 parts by weight, or 35 parts by weight to 45 parts by weight, but is not limited thereto.

In addition, based on 100 parts by weight of the biomass composition, xylose may be specifically included in a range of 10 parts by weight to 40 parts by weight, 10 parts by weight to 35 parts by weight, 10 parts by weight to 30 parts by weight, 15 parts by weight to 40 parts by weight, 15 parts by weight to 35 parts by weight, or 15 parts by weight to 30 parts by weight, but is not limited thereto.

In addition, based on 100 parts by weight of the biomass composition, lignin may be specifically included in a range of 10 parts by weight to 35 parts by weight, 10 parts by weight to 30 parts by weight, 10 parts by weight to 25 parts by weight, 15 parts by weight to 35 parts by weight, 15 parts by weight to 30 parts by weight, or 15 parts by weight to 25 parts by weight, but is not limited thereto.

In addition, based on 100 parts by weight of the biomass composition, ash may be specifically included in a range of 1 part by weight to 25 parts by weight, 1 part by weight to 20 parts by weight, 1 part by weight to 15 parts by weight, 3 parts by weight to 25 parts by weight, 3 parts by weight to 20 parts by weight, 3 parts by weight to 15 parts by weight, 5 parts by weight to 25 parts by weight, 5 parts by weight to 20 parts by weight, or 5 parts by weight to 15 parts by weight, but is not limited thereto.

Another aspect of the present disclosure to achieve the above objects provides a method for preparing a biomass composition, comprising (a) physically pretreating biomass; and (b) mixing the physically pretreated biomass and a solvent at a ratio (w/w) of 20:80 to 30:70 and stirring, wherein a concentration of the biomass is in a range of 20% to 30% (w/w) and a viscosity of the composition is in a range of 0.01 [Pa·s] to 10 [Pa·s]. Specifically, the physical treatment may include attrition mill treatment, but is not limited thereto.

The terms "biomass", "physical pretreatment", and "viscosity" are the same as described above.

DETAILED DESCRIPTION OF THE INVENTION

Hereinafter, the constitution and effects of the present disclosure will be described in more detail through examples. These examples are only for illustrating the present disclosure, and the scope of the present disclosure is not limited by the examples.

Since the physically pretreated biomass composition of the present disclosure has a low average particle size and a high density by attrition milling treatment, a low viscosity can be maintained even though it contains a high concentration of a biomass substrate when preparing a biomass slurry.

Therefore, it was confirmed that the physically pretreated biomass composition had excellent flowability and fluidity even when the concentration of the biomass substrate was 20% (w/w) or more.

Example 1: Preparation of Physically Pretreated Composition of Herbaceous Biomass In order to prepare a physically pretreated herbaceous biomass composition, the following experiments were performed.

Specifically, 5 types of herbaceous biomass of corn stover, wheat straw, *Miscanthus sacchartflorus*, rice straw, and bagasse were physically pretreated by attrition milling, grinder milling, hammer milling, or cutter milling method.

The attrition milling was performed for 10 minutes at 300 rpm using an attrition grinder (KHAM-305, Hankook Mineral Powder, Co., Ltd.). In addition, the grinder milling, hammer milling, and cutter milling were performed using a multi-purpose grinder (Multi Mill, RD1-15, グローエンジニアリング) 2 mm screen was used for the cutter milling and hammer milling, and the grinder milling was treated by adjusting the clearance to be 50 μm.

Example 2: Measurement of Particle Size and Density and Composition Analysis of Pulverized Biomass Composition The following experiments were performed to determine the particle size, density and composition of the physically pretreated herbaceous biomass composition.

Specifically, after tapping for 1 minute using 10 g of the physically pretreated composition prepared in Example 1 above, the density was measured by determining its volume (Table 1), and the average particle size of the physically pretreated composition was measured by dry analysis using a particle size analyzer (Particle size Analysis, LS I3 220, BECKMAN COULTER™) (Table 2). In addition, the components of the biomass treated by attrition milling were analyzed by the method of NREL Procedures LAP-002 (Table 3).

As a result, when treated by the attrition milling, the average particle size was 50 μm or less, and the density was 0.5 g/mL or more, showing a significant difference in an average particle size and density from other grinding methods. Through this, it was possible to predict that a relatively small amount of a solvent could be used due to the significantly low average particle size and high density of the herbaceous biomass treated by the attrition milling.

TABLE 1

Herbaceous biomass density by grinding method [g/mL]

|  | Corn stover | Wheat straw | Miscanthus sacchariflorus | Rice straw | Bagasse |
|---|---|---|---|---|---|
| Attrition milling | 0.56 | 0.50 | 0.56 | 0.50 | 0.50 |
| Grinder milling | 0.16 | 0.31 | 0.26 | 0.31 | 0.29 |
| Hammer milling | 0.18 | 0.20 | 0.26 | 0.20 | 0.19 |
| Cutter milling | 0.18 | 0.30 | 0.31 | 0.30 | 0.21 |

TABLE 2

Average particle size of herbaceous biomass depending on grinding method [μm]

|  | Corn stover | Wheat straw | Miscanthus sacchariflorus | Rice straw | Bagasse |
|---|---|---|---|---|---|
| Attrition milling | 36.2 | 19.3 | 48.1 | 17.5 | 25.9 |
| Grinder milling | 281.7 | 770.7 | 719.1 | 480.9 | 205.6 |
| Hammer milling | 608.9 | 882.3 | 905.6 | — | 665.0 |
| Cutter milling | 627.6 | 843.5 | 771.4 | 512.8 | 613.1 |

TABLE 3

Composition of attrition milling-treated biomass

|  | Corn stover | Wheat straw | Miscanthus sacchariflorus | Rice straw | Bagasse |
|---|---|---|---|---|---|
| Glucose | 37.5 | 37.1 | 41.6 | 42.9 | 40.9 |
| Xylose | 21.7 | 21.6 | 17.3 | 21.8 | 26.9 |
| Mannose | 0.6 | 0.6 | 0.8 | 0.0 | 0.0 |
| Galactose | 1.6 | 1.1 | 1.9 | 0.0 | 2.3 |
| Arabinose | 2.7 | 2.8 | 3.2 | 2.9 | 1.4 |
| Lignin | 19.3 | 21.0 | 21.7 | 17.5 | 20.7 |
| Ash | 6.3 | 6.3 | 2.6 | 11.6 | 4.8 |
| others | 10.3 | 9.5 | 10.9 | 3.3 | 3.0 |
| Total | 100.0 | 100.0 | 100.0 | 100.0 | 100.0 |

Example 3: Evaluation of Mixing Property of Physically Pretreated Biomass Composition with Solvent In order to examine the mixing property with a solvent at 20% (w/w), which is a high concentration substrate condition of the physically pretreated herbaceous biomass, 20 g of water was added to 5 g of milling-treated biomass and stirred (FIG. 1). As a result, in case of physical pretreatment other than attrition milling, because the moisture content is extremely limited compared to the volume of biomass as shown in FIG. 1 due to the significantly low density of raw materials, there was a phenomenon in which a solvent could not sufficiently moisten the biomass at 20% (w/w). However, when treated by the attrition milling, it was confirmed that mixing and flow were easy at a substrate concentration of 20% (w/w) due to smooth stirring.

Example 4: Measurement of Rheology Property of Physically Pretreated Biomass Slurry In order to compare and examine the flowability of the pulverized herbaceous biomass, the rheological properties of the biomass slurry were measured under the conditions shown in FIG. 2 using a rheometer (Rheometer, MCR702, AntonPaar).

Specifically, the biomass and water were mixed as shown in Table 4 and stirred for 1 minute, and then the viscosity was measured by the flow test measurement method under the rheometer measurement conditions of FIG. 2 (shear rate: 1 [1/s] to 100 [1/s], 4-bladed stirrer). As a result, in case of grinder, hammer, and cutter-milled biomass, rheological measurement could not be performed at 20% (w/w) because there was no movement as in Example 3, and thus measurement was performed at the maximum substrate concentration of 10% (w/w) at which measurement was possible.

TABLE 4

Substrate concentration of biomass slurry for viscosity measurement (%, w/w)

|  | Corn stover %(w/w) | Wheat straw %(w/w) | Miscanthus sacchariflorus %(w/w) | Rice straw %(w/w) | Bagasse %(w/w) |
|---|---|---|---|---|---|
| Attrition milling | 20 | 20 | 20 | 20 | 20 |
| Grinder milling | 10 | 10 | 10 | 10 | 10 |
| Hammer milling | 10 | 10 | 10 | 10 | 10 |
| Cutter milling | 10 | 10 | 10 | 10 | 10 |

The rheological measurement results of the physically pretreated biomass slurry are shown in FIG. 3. In the graph of FIG. 3, the x-axis represents the velocity at which the fluid moves, and it is common that as the velocity of the fluid is increased (the x-axis becomes greater) by applying a force to the fluid during measurement, viscosity decreases.

As a result of the rheological measurement of the physically pretreated biomass slurry (FIG. 3), when the attrition milling treatment was performed for all of the herbaceous biomass used in the Examples, even though the substrate concentration was 20% (w/w) which is higher than 10% (w/w) of the grinder, hammer, and cutter milling, it always showed a lower viscosity characteristic (y value) at the same x value (when the same force is applied to the fluid). Therefore, it is judged that the cost of reactor design and operation can be reduced when using biomass treated by the attrition milling because mixing and flow are advantageous.

In addition, after mixing the biomass and water together as shown in FIG. 5 and stirring for 1 minute, yield stress and flow stress were measured by the yield stress measurement method of FIG. 2. Among the biomasses treated by the attrition milling, corn stover and wheat straw were measured at a substrate concentration of 20% (w/w), and in case of Miscanthus sacchariflorus, rice straw and bagasse, since the fluidity is high, it is impossible to measure yield stress and flow stress because a force cannot be applied at a substrate concentration of 20% (w/w), and thus it was measured by increasing the substrate concentration to 25% (w/w). In addition, in case of grinder, hammer, and cutter-milled biomass, the rheological measurement could not be performed at 20% (w/w) because there was no movement as in Example 3, and thus the measurement was performed at the maximum substrate concentration of 10% (w/w) at which the measurement was possible.

TABLE 5

Substrate concentration of biomass slurry
for measuring yield stress and flow stress

|  | Corn stover %(w/w) | Wheat straw %(w/w) | Miscanthus sacchariflorus %(w/w) | Rice straw %(w/w) | Bagasse %(w/w) |
|---|---|---|---|---|---|
| Attrition milling | 20 | 20 | 25 | 25 | 25 |
| Grinder milling | 10 | 10 | 10 | 10 | 10 |
| Hammer milling | 10 | 10 | 10 | 10 | 10 |
| Cutter milling | 10 | 10 | 10 | 10 | 10 |

As a result, when the attrition milling was treated for most of the herbaceous biomasses used in the Examples, it showed lower yield stress and flow stress, even though the substrate concentration was 20% to 25% (w/w), which was higher than 10% (w/w) of grinder, hammer, and cutter milling (Table 6, FIG. 4, and FIG. 5). Meanwhile, when the cutter milling was treated for corn stover and Miscanthus sacchariflorus biomasses, and when the hammer milling was treated for wheat straw and Miscanthus sacchartflorus biomasses, yield stress or flow stress was measured to be low compared to when treated with the attrition milling, and this was measured as such because the concentration of the biomass substrate that was treated by the cutter milling or hammer milling was significantly low at 10% (w/w). If the concentration of the substrate is the same, it can be expected that the yield stress and flow stress of the biomass treated by the attrition milling are significantly lower than those of the cutter milling or hammer milling treatment. In addition, the portion where the measured value was not described was impossible to measure because there was no flowability itself.

Therefore, in case of the attrition-milled biomass slurry, it is considered to be advantageous for mixing and flow compared to a grinder, hammer, or cutter-milled biomass slurry, and it is judged that the cost of reactor design and operation can be reduced.

In addition, Miscanthus sacchariflorus, rice straw, and bagasse slurries had a somewhat high slurry substrate concentration for yield stress and flow stress compared to corn stover and wheat straw slurries in the attrition milling. Through this, it can be predicted that Miscanthus sacchariflorus, rice straw, and bagasse had greater liquidity than corn straw and wheat straw.

TABLE 6

|  | Corn stover | | Wheat straw | | Miscanthus sacchariflorus | | Rice straw | | Bagasse | |
|---|---|---|---|---|---|---|---|---|---|---|
|  | Yield stress [pa] | Flow stress [pa] | Yield stress [pa] | Flow stress [pa]] | Yield stress [pa] | Flow stress [pa] | Yield stress [pa] | Flow stress [pa]] | Yield stress [pa] | Flow stress [pa] |
| Attrition milling (20~25% w/w) | 8.2 | 8.2 | 4.8 | 8.6 | 82.0 | 91.0 | 12.6 | 30.1 | 4.4 | 10.7 |
| Grinder milling (10% w/w) | 93.1 | 93.1 | 180.4 | 191.9 | 96.7 | 98.8 | 90.1 | 96.5 | — | — |
| Hammer milling (10% w/w) | 63.5 | 63.5 | 3.0 | 19.7 | 81.9 | 90.9 | — | — | 96.1 | 98.2 |
| Cutter milling (10% w/w) | 20.8 | 20.8 | 160.6 | — | 23.0 | 25.8 | 58.5 | 66.5 | 13.7 | 32.8 |

From these results, it was confirmed that the herbaceous biomass slurry composition treated by the attrition milling had significantly improved mixing and flow under a high concentration substrate condition compared to biomasses that were treated with conventional grinding methods such as grinder, hammer, and cutter milling. That is, due to the remarkably low density characteristics inherent to the herbaceous system when reacting with a liquid, herbaceous biomass cannot have a substrate concentration that exceeds 10% (w/w), but when treated with the attrition milling, it was confirmed that mixing and flow are possible under a high concentration substrate condition of 20% (w/w) or more so that reaction is possible.

From the above description, those skilled in the art will appreciate that the present disclosure can be implemented in other specific forms without changing the technical spirit or essential features. In this regard, the embodiments described above are to be understood in all respects as illustrative and not restrictive. The scope of the present disclosure should be construed that all changes or modifications derived from the meaning and scope of the following claims and equivalent concepts rather than the detailed description are included in the scope of the present disclosure.

The invention claimed is:

1. A method for preparing a biomass composition, comprising:
   (a) pretreating biomass using only attrition mill treatment, excluding chemically pretreating the biomass; and
   (b) mixing the physically pretreated biomass and a solvent at a ratio (w/w) of 20:80 to 30:70 and stirring,
   wherein a concentration of biomass in the biomass composition is in a range of 20% to 25% (w/w),
   wherein the biomass comprises corn stover, wheat straw, rice straw, or bagasse, and
   wherein a yield stress and a flow stress of the biomass composition in a range of 1 [Pa] to 100 [Pa].

2. The method of claim 1, wherein an average particle size of the biomass is in a range of 10 μm to 50 μm.

3. The method of claim 1, wherein a density of the biomass is in a range of 0.4 g/mL to 0.6 g/mL.

4. The method of claim 1, wherein the biomass composition comprises glucose, xylose, lignin, and ash.

5. The method of claim 1, wherein the biomass composition comprises xylose at a concentration in a range of 10 parts by weight to 40 parts by weight of 100 parts by weight of the biomass composition.

6. The method of claim 1, wherein the biomass composition comprises glucose at a concentration in a range of 25 parts by weight to 55 parts by weight of 100 parts by weight of the physically pretreated biomass composition.

7. The method of claim 1, wherein the biomass composition comprises lignin at a concentration in a range of 10 parts by weight to 35 parts by weight of 100 parts by weight of the physically pretreated biomass composition.

8. The method of claim 1, wherein the biomass composition comprises ash at a concentration in a range of 1 part by weight to 25 parts by weight of 100 parts by weight of the physically pretreated biomass composition.

9. The method of claim 1, wherein the yield stress and the flow stress of the biomass composition are in a range of 1 [Pa] to 60 [Pa].

10. The method of claim 1, wherein the yield stress and the flow stress of the biomass composition are in a range of 1 [Pa] to 40 [Pa].

11. The method of claim 1, wherein a viscosity of the biomass composition is in a range of 0.01 [Pa·s] to 10 [Pa·s] at shear rate of 1-100 [1/s].

* * * * *